United States Patent
Nam

(10) Patent No.: US 11,853,573 B2
(45) Date of Patent: Dec. 26, 2023

(54) STORAGE DEVICE SHARING SYSTEM AND OPERATING METHOD THEREOF

(71) Applicant: SK hynix Inc., Icheon (KR)

(72) Inventor: Yun Seung Nam, Icheon (KR)

(73) Assignee: SK hynix Inc., Icheon (KR)

( * ) Notice: Subject to any disclaimer, the term of this patent is extended or adjusted under 35 U.S.C. 154(b) by 6 days.

(21) Appl. No.: 17/836,776

(22) Filed: Jun. 9, 2022

(65) Prior Publication Data

US 2023/0152997 A1    May 18, 2023

(30) Foreign Application Priority Data

Nov. 12, 2021   (KR) ......................... 10-2021-0155840

(51) Int. Cl.
*G06F 3/06* (2006.01)

(52) U.S. Cl.
CPC ............ *G06F 3/064* (2013.01); *G06F 3/0604* (2013.01); *G06F 3/0656* (2013.01); *G06F 3/0659* (2013.01); *G06F 3/0673* (2013.01)

(58) Field of Classification Search
CPC ...... G06F 3/064; G06F 3/0604; G06F 3/0656; G06F 3/0659; G06F 3/0673
USPC .................................................. 711/154, 147
See application file for complete search history.

(56) References Cited

U.S. PATENT DOCUMENTS

| | | | |
|---|---|---|---|
| 9,189,397 B2* | 11/2015 | Jung | G06F 3/061 |
| 10,394,487 B2* | 8/2019 | Lee | G06F 3/0656 |
| 2008/0270744 A1* | 10/2008 | Hashimoto | G06F 13/1673 711/217 |
| 2019/0065102 A1* | 2/2019 | Shin | G06F 12/0897 |
| 2019/0317691 A1* | 10/2019 | Kanno | G06F 12/0246 |

FOREIGN PATENT DOCUMENTS

| | | |
|---|---|---|
| KR | 101862379 B1 | 7/2018 |
| KR | 102219759 B1 | 2/2021 |

* cited by examiner

*Primary Examiner* — Than Nguyen

(57) ABSTRACT

The embodiments of the present disclosure relate to a storage device sharing system and operation method thereof. According to embodiments of the present disclosure, the storage device sharing system may include i) a plurality of storage devices, each storage device including a first memory buffer including a plurality of first type memory blocks and a second memory buffer including a plurality of second type memory blocks, and ii) a host device configured to determine, based on sharing state set for a first storage device among the plurality of storage devices, whether to set the first memory buffer of the first storage device as an area for storing data to be written to a second storage device among the plurality of storage devices.

14 Claims, 14 Drawing Sheets

STORAGE DEVICE SHARING SYSTEM AND OPERATING METHOD THEREOF

CROSS-REFERENCES TO RELATED APPLICATION

The present application claims priority under 35 U.S.C. 119(a) to Korean patent application number 10-2021-0155840, filed on Nov. 12, 2021, which is incorporated herein by reference in its entirety.

TECHNICAL FIELD

The embodiments of the present disclosure relate to a storage device sharing system and operation method thereof.

BACKGROUND

A memory system includes a data storage device that stores data on the basis of a request from a host, such as a computer, a server, a smartphone, a tablet PC, or other electronic devices. Examples of the memory system range from a traditional magnetic-disk-based hard disk drive (HDD) to a semiconductor-based data storage device such as a solid state drive (SSD), a universal flash storage (UFS) device, or an embedded MMC (eMMC) device.

The memory system may further include a memory controller for controlling a memory device. The memory controller may receive a command from the host and, on the basis of the received command, may execute the command or control read/write/erase operations on the memory devices in the memory system. The memory controller may be used to execute firmware operations for performing a logical operation for controlling such operations.

Meanwhile, a system (e.g., cloud computing system, data center) that processes a large amount of data may use a plurality of storage devices to process the large amount of data. In this case, when a failure occurs in a storage device among the plurality of storage devices, the system no longer uses the storage device in which the failure occurred.

SUMMARY

Embodiments of the present disclosure may provide a storage device sharing system and operating method thereof, capable of using some of the resources in a storage device to improve the performance of another storage device.

Also, embodiments of the present disclosure may provide a storage device sharing system and operating method thereof, capable of avoiding the problem of not using the resources contained in the failed storage device.

In one aspect, embodiment of the present disclosure may provide a storage device sharing system comprising: i) a plurality of storage devices, each storage device including a first memory buffer including a plurality of first type memory blocks and a second memory buffer including a plurality of second type memory blocks, and ii) a host device configured to determine, based on a sharing state set for a first storage device among the plurality of storage devices, whether to set the first memory buffer of the first storage device as an area for storing data to be written to a second storage device among the plurality of storage devices.

In another aspect, embodiments of the present disclosure may provide an operating method of a storage device sharing system comprising: setting a sharing state for a first storage device among a plurality of storage devices included in the storage device sharing system, each storage device including a first memory buffer including a plurality of first type memory blocks and a second memory buffer including a plurality of second type memory blocks, and determining, based on the sharing state of the first storage device, whether to configure the first memory buffer of the first storage device as an area for storing data to be written to a second storage device among the plurality of storage devices.

According to embodiments of the present disclosure, it is possible to use some of the resources in a failed storage device to improve the performance of another storage device and avoid the problem of not using the resources contained in the failed storage device.

DETAIL DESCRIPTION OF THE EMBODIMENTS

Figure 1:
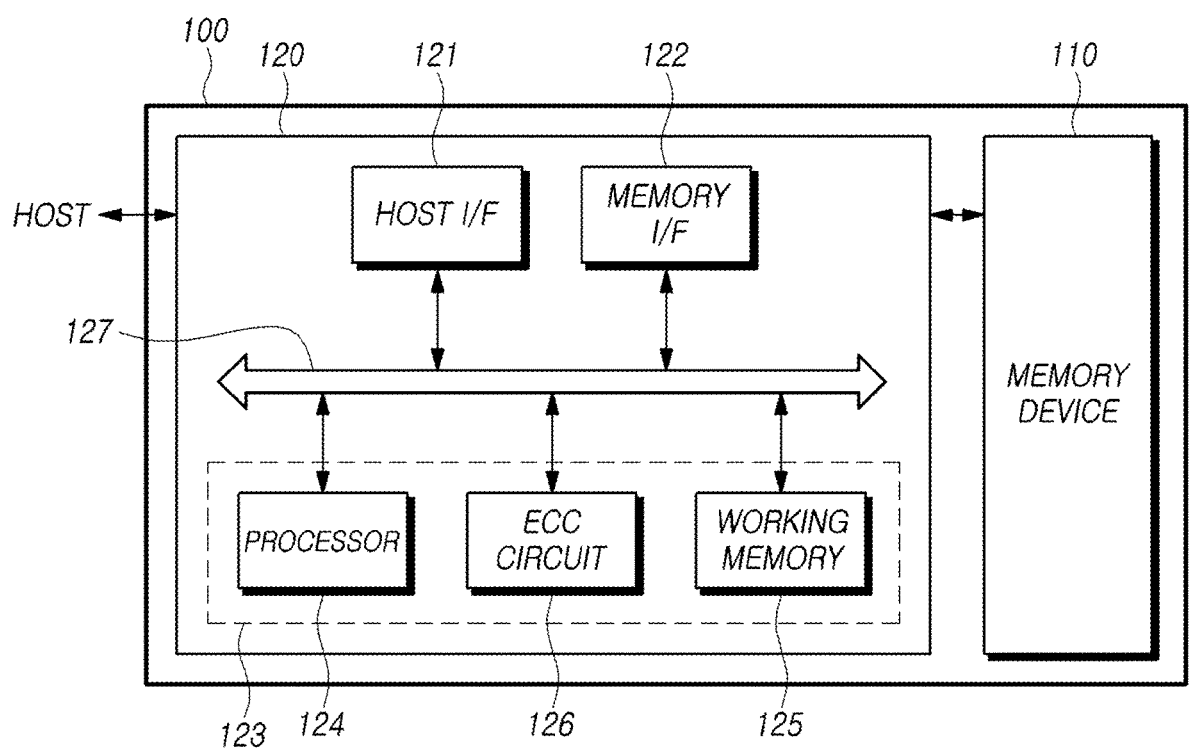
FIG. 1 illustrates a configuration of a memory system according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The code or instructions may be stored on non-transitory computer-readable media. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 illustrates a memory system 100 according to an embodiment of the present disclosure.

In some implementations, the memory system 100 may include a memory device 110 configured to store data, and a memory controller 120 configured to control the memory device 110. In this disclosure, a solid-state device such as a flash memory is used as an illustrative example of a memory device, but embodiments are not limited thereto.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented using various types of devices, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus® dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM). In some implementations, the memory device may include a Hard Disk Drive (HDD) or other type of electro-mechanical data storage device.

The memory device 110 may be implemented using a three-dimensional array structure. Some embodiments of the disclosed technology are applicable to any type of flash memory devices having an electric charge storage layer. In an implementation, the electric charge storage layer may be formed of a conductive material, and such an electric charge storage layer may be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

Firmware may refer to a program or software stored on a nonvolatile memory that is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements (such as the host interface 121, memory interface 122, processor 124, working memory 125, and error detection/correction circuit 126) of the memory controller 120. The bus 127 may include, for example, a control bus for delivering various types of control signals and commands, and a data bus for delivering various types of data.

By way of example, FIG. 1 illustrates the above-mentioned constituent elements of the memory controller 120. It is noted that some of those illustrated in the drawings may be omitted, or some of the above-mentioned constituent elements of the memory controller 120 may be integrated into a single element. In addition, in some implementations, one or more other constituent elements may be added to the above-mentioned constituent elements of the memory controller 120.

Figure 2:
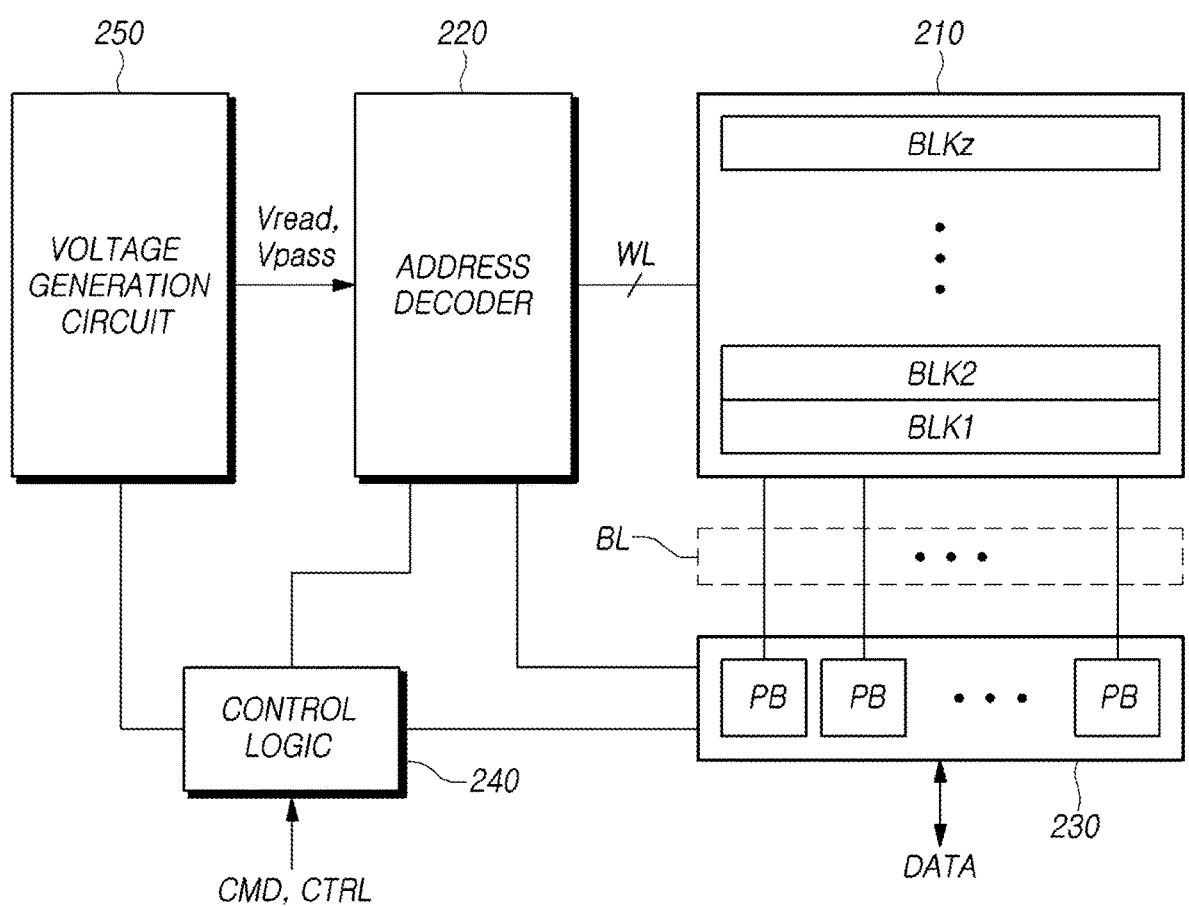
FIG. 2 illustrates a memory device according to an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged in the rows and columns.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. In embodiments, the multiple memory cells are nonvolatile memory cells. In some implementations, such nonvolatile memory cells may be arranged in a vertical channel structure.

In embodiments, the memory cell array 210 may be configured as a memory cell array having a two-dimensional structure a memory cell array having a three-dimensional structure, or a combination thereof.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell. In embodiments, the number of bits stored in some memory cells may be dynamically configurable; for example, for memory cells capable of storing 2 or more bits of data, a subset of the memory cells may be dynamically configurable to operate as SLCs storing one bit of data instead. The size of the subset operating as SLCs may also be dynamically configurable.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
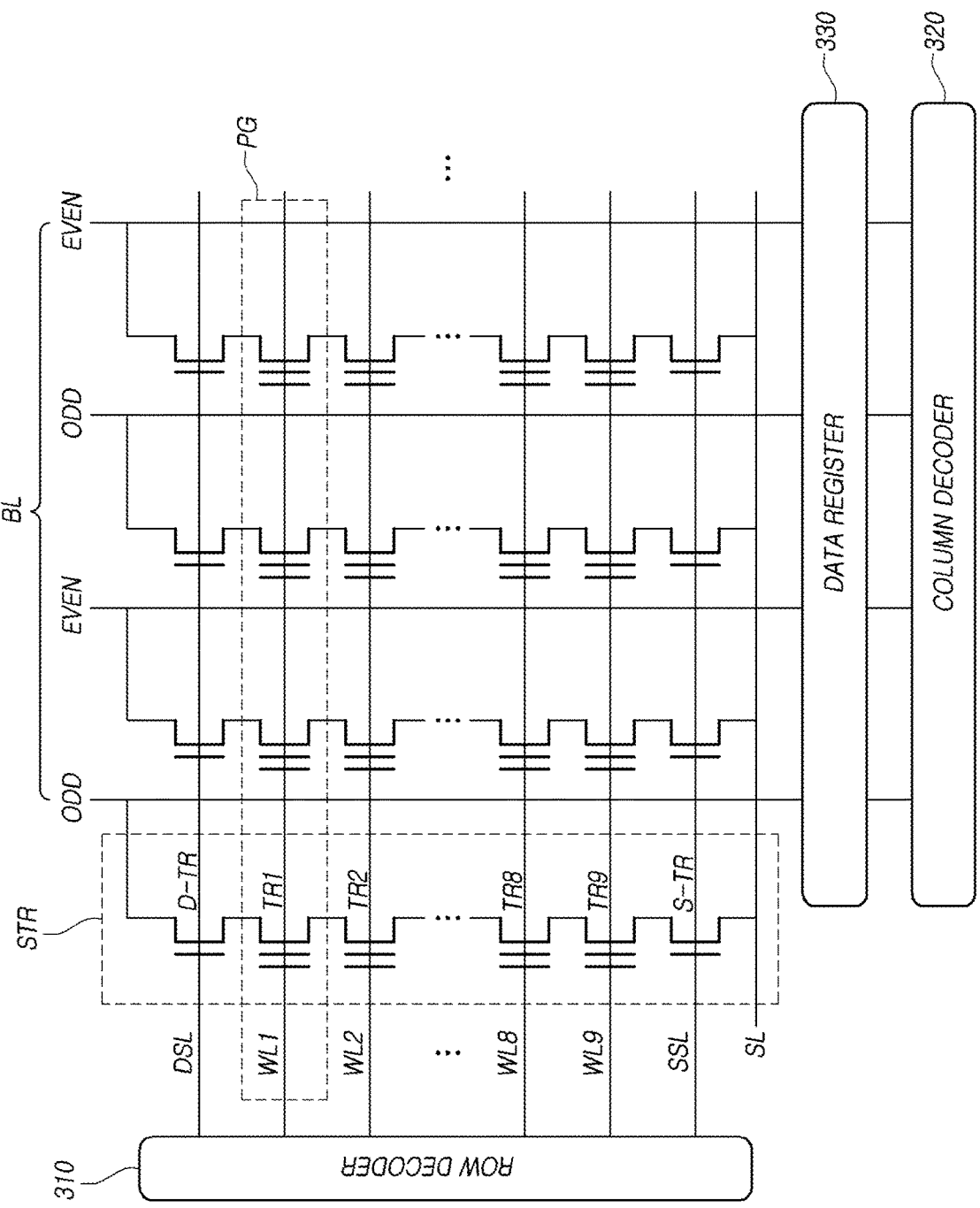
FIG. 3 illustrates a structure of word lines and bit lines of a memory device according to an embodiment of the present disclosure.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) that includes circuitry that is used to perform the operations of the memory cell array 210.

In the core area, a certain number of memory cells arranged in one direction can be called a "page" PG, and a certain number of memory cells that are coupled in series can be called a "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some implementations, the memory device 110 applies a predetermined turn-on voltage Vcc to the gate electrode of the first selection transistor D-TR, thereby turning on the first selection transistor D-TR, and applies a predetermined turn-off voltage (e.g., OV) to the gate electrode of the second selection transistor S-TR, thereby turning off the second selection transistor S-TR.

The memory device 110 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory device 110 may apply a predetermined voltage (e.g., +20V) to the substrate through a source line SL during an erasure operation. The memory device 110 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
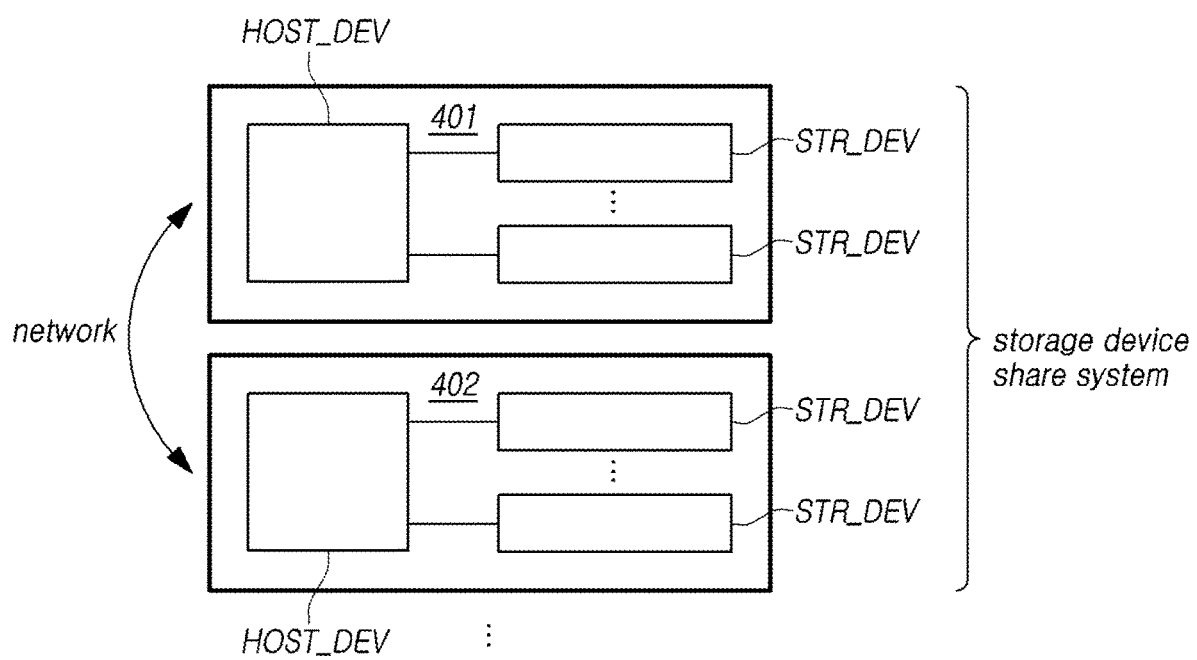
FIG. 4 illustrates a plurality of storage device sharing systems according to embodiments of the present disclosure.

FIG. 4 illustrates a plurality of storage device sharing systems according to embodiments of the present disclosure. The plurality of storage device sharing systems includes a first storage device sharing system 401 and a second storage device sharing system 402. Although FIG. 4 shows the plurality of storage device sharing systems including two storage device sharing systems, embodiments are not limited thereto.

Each of the storage device sharing systems 401 and 402 may respectively include a host device HOST_DEV and a plurality of storage devices STR_DEV. The number of storage devices STR_DEV included in the first storage device sharing system 401 may be different from the number of storage devices STR_DEV included in the second storage device sharing system 402.

The plurality of storage device sharing systems may be connected to each other through a network or communication interface. A host device HOST_DEV included in a storage device sharing system among the plurality of storage device sharing systems may transmit/receive data to/from a host device HOST_DEV included in another storage device sharing system through a network (e.g., LAN (Local Area Network), WLAN (Wireless LAN), 5G ($5^{th}$ generation wireless network), LTE (Long Term Evolution wireless network), or Bluetooth network), through a communication interface (e.g., USB (Universal Serial Bus), SCSI (Small Computer System Interface), PCI (Peripheral Component Interconnect) express, ATA (AT Attachment), PATA (Parallel ATA), SATA (Serial ATA), SAS (Serial Attached SCSI)).

Hereinafter, a schematic structure of a storage device sharing systems such as may be included in the plurality of storage device sharing systems of FIG. 4 will be described in detail with reference to FIG. 5.

Figure 5:
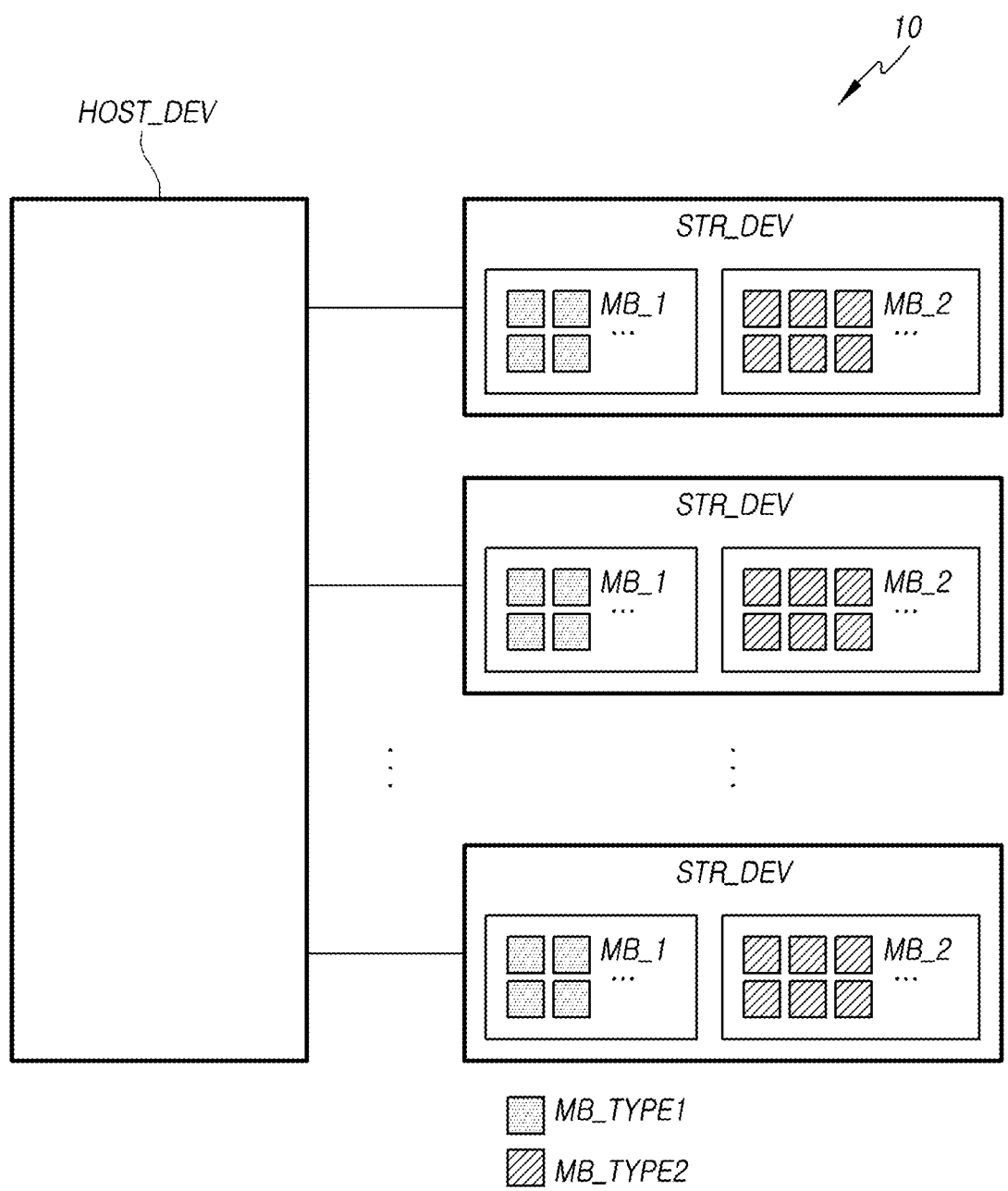
FIG. 5 illustrates a storage device sharing system according to embodiments of the present disclosure.

FIG. 5 illustrates a schematic structure of a storage device sharing system 10 according to embodiments of the present disclosure.

The storage device sharing system 10 may include a plurality of storage devices STR_DEV and a host device HOST_DEV. The plurality of storage devices STR_DEV may be connected to the host device HOST_DEV.

The plurality of storage devices STR_DEV include devices capable of storing data, such as one or more hard disk drives (HDDs), one or more solid state drive (SSDs), one or more universal flash storage (UFS) devices, one or more eMMC (embedded MMC) devices, or the like, or combinations thereof.

In embodiments, the plurality of storage devices STR_DEV may correspond to the memory system 100 described above with reference to FIG. 1.

The plurality of storage devices STR_DEV may each respectively include a first memory buffer MB_1 and a second memory buffer MB_2.

The first memory buffer MB_1 may include a plurality of first type memory blocks MB_TYPE1, and the second memory buffer MB_2 may include a plurality of second type memory blocks MB_TYPE2.

In this case, the number of data bits storable in the memory cells included in the first type memory blocks MB_TYPE1 may be less than the number of data bits storable in the memory cells included in the second type memory blocks MB_TYPE2. For example, the first type memory blocks MB_TYPE1 may be SLC memory blocks including SLC memory cells. And the second type memory blocks MB_TYPE2 may be TLC memory blocks including TLC memory cells or may be QLC memory blocks including QLC memory cells.

On the other hand, the number of data bits storable in the memory cells included in the first type memory blocks MB_TYPE1 may be greater than or equal to the number of data bits storable in the memory cells included in the second type memory blocks MB_TYPE2.

The host device HOST_DEV may write data stored in the plurality of storage devices STR_DEV, or read data stored in the plurality of storage devices STR_DEV.

When the plurality of storage devices STR_DEV respectively correspond to the memory system 100 described in FIG. 1, the host device HOST_DEV may correspond to the host HOST described in FIG. 1.

The host device HOST_DEV may be a computing device (e.g., desktop, laptop, server) capable of running an operating system (OS) and executing a plurality of applications based on the operating system. The host device HOST_DEV may communicate with a plurality of storage devices STR_DEV based on a predetermined interface (e.g., USB, SATA, SCSI, PCI express). To this end, a driver for supporting the corresponding interface may be installed in the host device HOST_DEV. The host device HOST_DEV may include a CPU (Central Processing Unit) and a volatile memory (e.g., SRAM, DRAM, that is, a non-transitory computer readable media) in communication with the CPU, the volatile memory storing i) data used for operations performed by the CPU to provide the above-described operating system and the plurality of applications and for performing communication operations with the plurality of storage devices STR_DEV, and ii) data to be written to or that has been read from the plurality of storage devices STR_DEV.

In embodiments of the present disclosure, the host device HOST_DEV may change, according to sharing state set for a first storage device among the plurality of storage devices STR_DEV, a setting for the first memory buffer MB_1 included in the first storage device.

The sharing state of the first storage device indicates whether some of the resources included in the first storage device (e.g., the first memory buffer MB_1 of the first storage device) can be used to store data intended for another storage device.

The host device HOST_DEV may transmit the sharing state of the plurality of storage devices STR_DEV to the plurality of storage devices STR_DEV, or receive the sharing state of the plurality of storage devices STR_DEV from the plurality of storage devices STR_DEV. In addition, the host device HOST_DEV may update the sharing state of the plurality of storage devices STR_DEV, and transmit, when a new storage device is added, the sharing state of the added storage device to the other storage devices.

Figure 6:
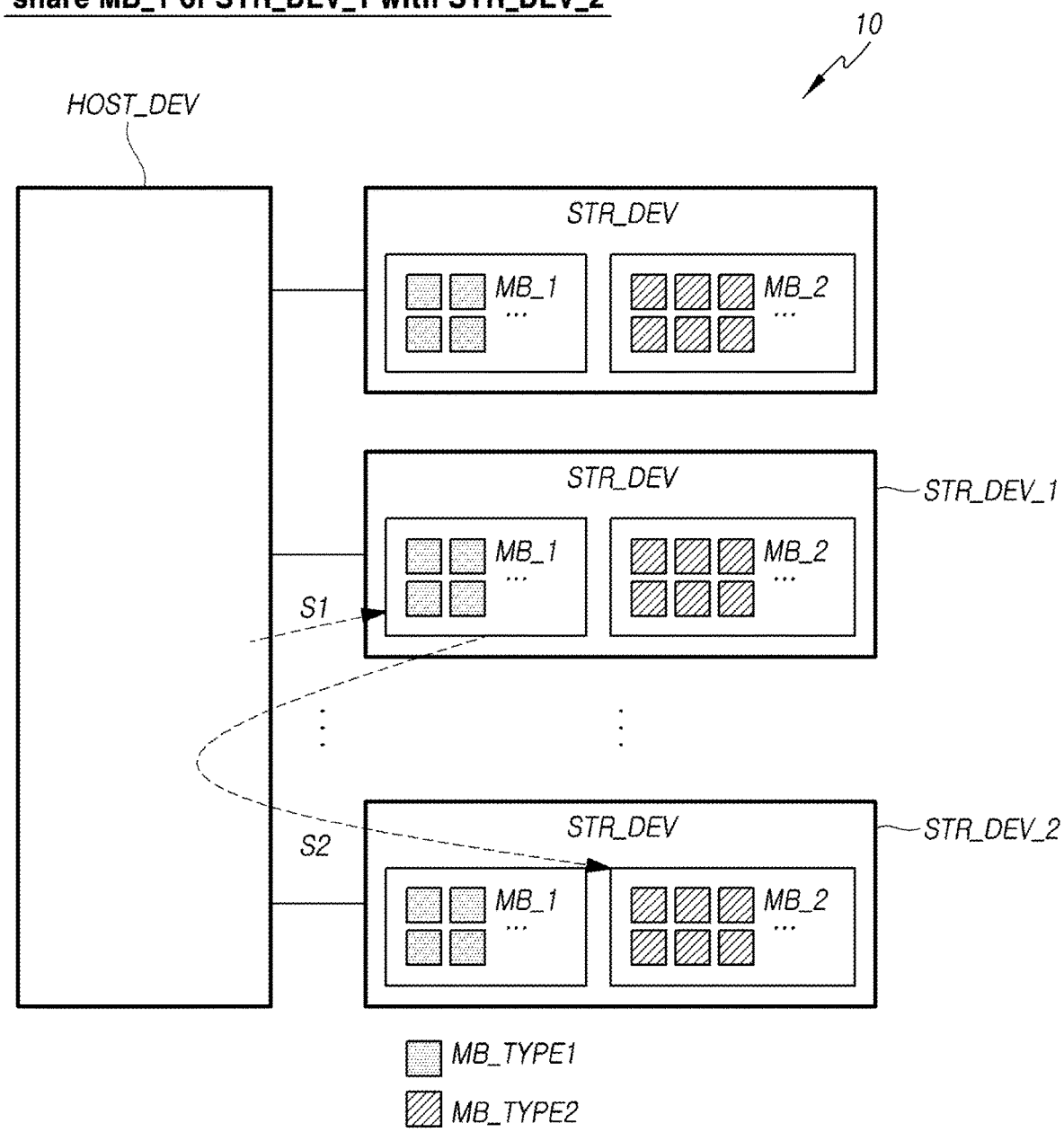
FIG. 6 illustrates an operation in which the storage device sharing system sets a first memory buffer of a first storage device to be shared by a second storage device according to embodiments of the present disclosure.

FIG. 6 illustrates an operation in which the storage device sharing system 10 sets the first memory buffer MB_1 of the first storage device STR_DEV_1 to be shared by the second storage device STR_DEV_2 according to embodiments of the present disclosure.

Referring to FIG. 6, the host device HOST_DEV of the storage device sharing system 10 may allow the second storage device STR_DEV_2 to share the first memory buffer MB_1 of the first storage device STR_DEV_1.

The second storage device STR_DEV_2 sharing the first memory buffer MB_1 of the first storage device STR_DEV_1 means that the first memory buffer MB_1 of the first storage device STR_DEV is set as an area for storing data to be written to the second storage device STR_DEV_2.

When the second storage device STR_DEV_2 shares the first memory buffer MB_1 of the first storage device STR_DEV_1, in operation S1, the host device HOST_DEV may first store data to be written to the second storage device STR_DEV_2 in the first memory buffer MB_1 of the first storage device STR_DEV_1.

Subsequently, in operation S2, the host device HOST_DEV may migrate data stored in the first memory buffer MB_1 of the first storage device STR_DEV_1 to the second memory buffer MB_2 of the second storage device STR_DEV_2.

In this case, the data stored in the first memory buffer MB_1 of the first storage device STR_DEV_1 may be migrated to the second memory buffer MB_2 of the second storage device STR_DEV_2 via the host device HOST_DEV. That is, the host device HOST_DEV may load data stored in the first memory buffer MB_1 of the first storage device STR_DEV_1, and write the loaded data to the second memory buffer MB_2 of the second storage device STR_DEV_2.

To this end, the host device HOST_DEV may establish a tunnel that is a virtual path through which data is transmitted between the first storage device STR_DEV_1 and the second storage device STR_DEV_2. The host device HOST_DEV may perform data input/output through the tunnel, which is a virtual logical configuration located in an upper layer of a physical layer of a protocol stack used by the first storage device STR_DEV_1 and the second storage device STR_DEV_2.

As such, the host device HOST_DEV may use the first memory buffer MB_1 of the first storage device STR_DEV_1 as an area for temporarily storing data to be stored in the second memory buffer MB_2 of the second storage device STR_DEV_2. For example, the first memory buffer MB_1 of the first storage device STR_DEV_1 may be used as a write buffer or a write cache for data that is intended to be stored in the second memory buffer MB_2 of the second storage device STR_DEV_2.

In the embodiments of the present disclosure, the host device HOST_DEV may determine, based on the sharing state set for the first storage device STR_DEV_1 among the plurality of storage devices STR_DEV, whether to set the first memory buffer MB_1 of the first storage device STR_DEV_1 as an area for storing data to be written to the second storage device STR_DEV_2 among the plurality of storage devices STR_DEV. Hereinafter, this will be described in detail.

For example, the host device HOST_DEV may set the sharing state of the first storage device STR_DEV_1 to one of the states shown in Table 1.

TABLE 1

| Share Status | Value | Meaning |
| --- | --- | --- |
| Standby | 0 | sharing operation is not executed |
| Ready | 1 | sharing is enabled |
| Connect | 2 | sharing is in progress |
| Share | 3 | being shared |
| Pause | 4 | sharing is paused |
| Stop (Disconnect) | 5 | sharing is finished |

Additionally, the host device HOST_DEV may set, for example, the sharing mode for the first storage device STR_DEV_1 to one of the modes shown in Table 2. The sharing mode for the first storage device STR_DEV_1 disclosed in Table 2 may indicate a resource shared in the first storage device STR_DEV_1 and the number of storage device sharing the resource. In Table 2, an XLC memory block is a memory block in which each memory cell stores two or more bits of data.

TABLE 2

| Share Mode | Value | Meaning |
| --- | --- | --- |
| None | 0 | resource is not shared |
| SLC Sole | 1 | one SLC memory block is shared by one or more storage devices |
| XLC Sole | 2 | one XLC memory block is shared by one or more storage devices |
| SLC Dual | 3 | two SLC memory blocks are shared by one or more storage devices |
| XLC Dual | 4 | two XLC memory blocks are shared by one or more storage devices |
| SLC Triple | 5 | three SLC memory blocks are shared by one or more storage devices |
| XLC Triple | 6 | three XLC memory blocks are shared by one or more storage devices |

Additionally, the host device HOST_DEV may set, for example, whether the first storage device STR_DEV_1 supports sharing to one of the values shown in Table 3. When the first storage device STR_DEV_1 supports sharing, the first memory buffer MB_1 of the first storage device STR_DEV_1 may be set as an area for storing data to be written to a second storage device STR_DEV_2 among the plurality of storage devices STR_DEV.

TABLE 3

| Share Support | Value | Meaning |
| --- | --- | --- |
| Not Support | 0 | sharing is not supported |
| Support | 1 | sharing is supported |
| Ready | 2 | firmware update is needed to support sharing |

Additionally, the host device HOST_DEV may set, for example, whether the first storage device STR_DEV_1 is enabled to one of the values shown in Table 4.

TABLE 4

| Enabled | Value | Meaning |
| --- | --- | --- |
| Disable | 0 | disable |
| Enable | 1 | enable |

Figure 7:
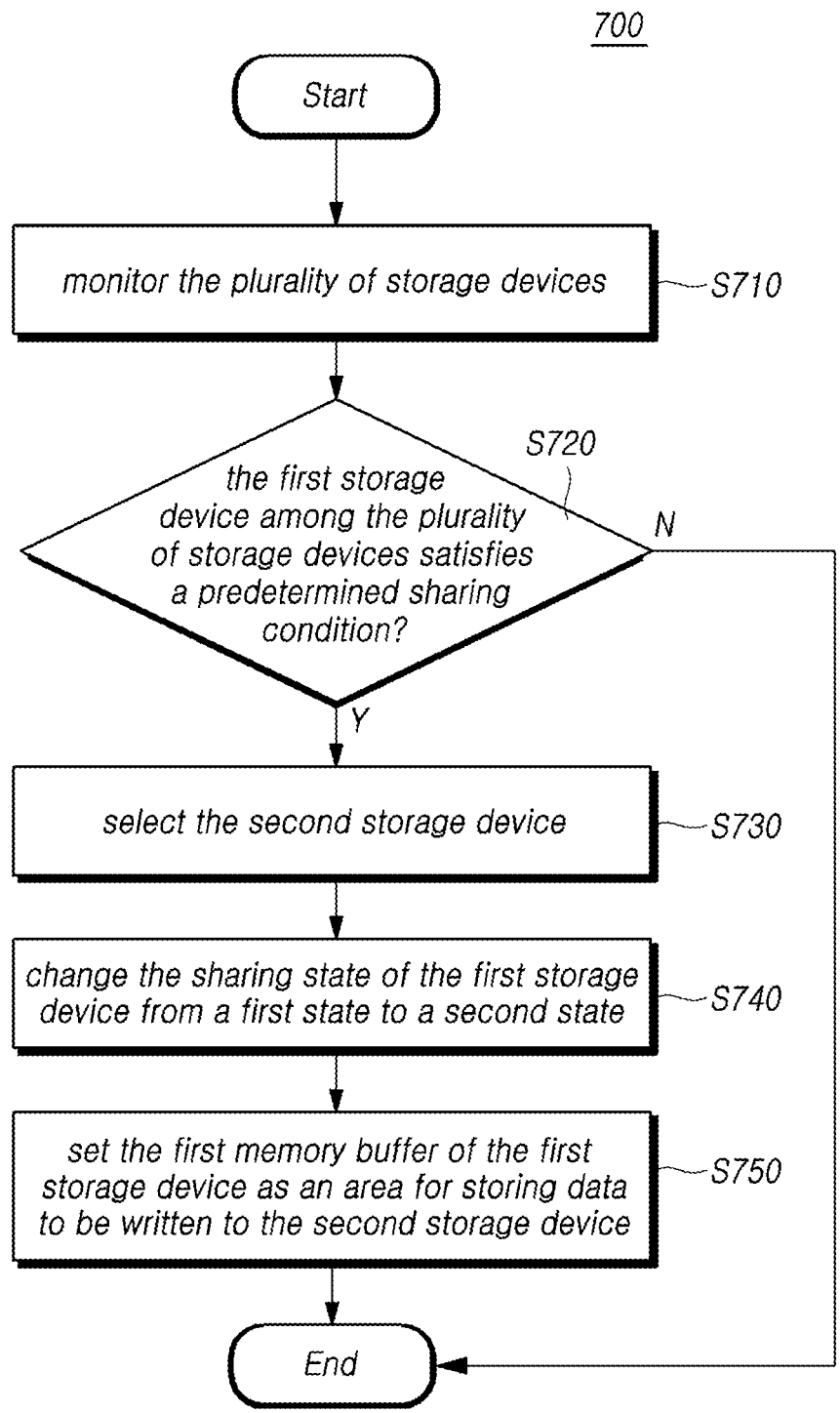
FIG. 7 illustrates an operation in which the storage device sharing system changes the sharing state of the first storage device according to embodiments of the present disclosure.

FIG. 7 illustrates a flow chart illustrating an operation 700 in which the storage device sharing system 10 may change the sharing state of a first storage device STR_DEV_1 according to embodiments of the present disclosure.

Referring to FIG. 7, at step S710, the host device HOST_DEV of the storage device sharing system 10 may monitor the plurality of storage devices STR_DEV. In this case, the host device HOST_DEV and the plurality of storage devices STR_DEV are connected to each other to communicate with each other. Each of the plurality of storage devices STR_DEV may transmit its own state to the host device HOST_DEV, and the host device HOST_DEV may receive the transmitted states and check the state of each of the plurality of storage devices STR_DEV.

At step S720, the host device HOST_DEV determines whether the first storage device STR_DEV_1 among the plurality of storage devices STR_DEV satisfies a predetermined sharing condition based on the result of monitoring the plurality of storage devices STR_DEV. The predetermined sharing condition may relate to device health information of each of the plurality of storage devices STR_DEV, as discussed below.

If the first storage device STR_DEV_1 does not satisfy the sharing condition (S720-N), the host device HOST_DEV may terminate the operation 700 without setting the first storage device STR_DEV_1 to be shared with other storage devices.

On the other hand, if the first storage device STR_DEV_1 satisfies the sharing condition (S720-Y), the host device HOST_DEV may, at step S730, select a second storage device STR_DEV_2 among the plurality of storage devices STR_DEV connected to the host device HOST_DEV as the storage device that the first storage device STR_DEV_1 will share storage with.

In embodiments, the host device HOST_DEV may automatically select the second storage device STR_DEV_2 from among the plurality of storage devices STR_DEV according to predetermined policy or priority. In embodiments, the host device HOST_DEV may select a storage device directly selected by a user from among the plurality of storage devices STR_DEV as the second storage device STR_DEV_2.

At step S740, the host device HOST_DEV may change the sharing state of the first storage device STR_DEV_1 from a first state (such as the standby state, value=0, of Table 1) to a second state (such as the share state, value=3, of Table 1).

In this case, for example, the host device HOST_DEV may operate as follows to change the sharing state of the first storage device STR_DEV_1 from the first state to the second state.

First, the host device HOST_DEV may change the sharing state of the first storage device STR_DEV_1 to the ready state (value=1) described in Table 1.

The host device HOST_DEV may then change the sharing state of the first storage device STR_DEV_1 to the connect state (value=2) described in Table 1. In this case, the first storage device STR_DEV_1 may transmit information on the memory blocks included in itself (e.g., storage status of hot/cold data, error bit occurrence status, wear-leveling execution status, garbage collection execution status, bad memory block status) to the host device HOST_DEVICE.

After receiving information on the first storage device STR_DEV_1, the host device HOST_DEV may execute operations required to place the first memory buffer MB_1 of the first storage device STR_DEV_1 in a state that can be shared by the second storage device STR_DEV_2. For example, the host device HOST_DEV may migrate data already stored in the first memory buffer MB_1 and the second memory buffer MB_2 of the first storage device STR_DEV_1 to another storage device for data integrity, and suspend data input/output operation for the first storage device STR_DEV_1.

Thereafter, the host device HOST_DEV may change the sharing state of the first storage device STR_DEV_1 to the second state (e.g., the share state, value=3).

At step S750, the host device HOST_DEV may set the first memory buffer MB_1 of the first storage device STR_DEV_1 as an area for storing data to be written in the second storage device STR_DEV_2.

In embodiments, the first memory buffer MB_1 of the first storage device STR_DEV_1 may also be set as an area for storing data to be written to other storage device as well as the second storage device STR_DEV_2. In this case, the first memory buffer MB_1 of the first storage device STR_DEV_1 may be simultaneously shared by two or more storage devices.

Hereinafter, an operation of the storage device sharing system 10 based on the sharing state of the first storage device STR_DEV_1 will be described with reference to FIGS. 8 and 9.

Figure 8:
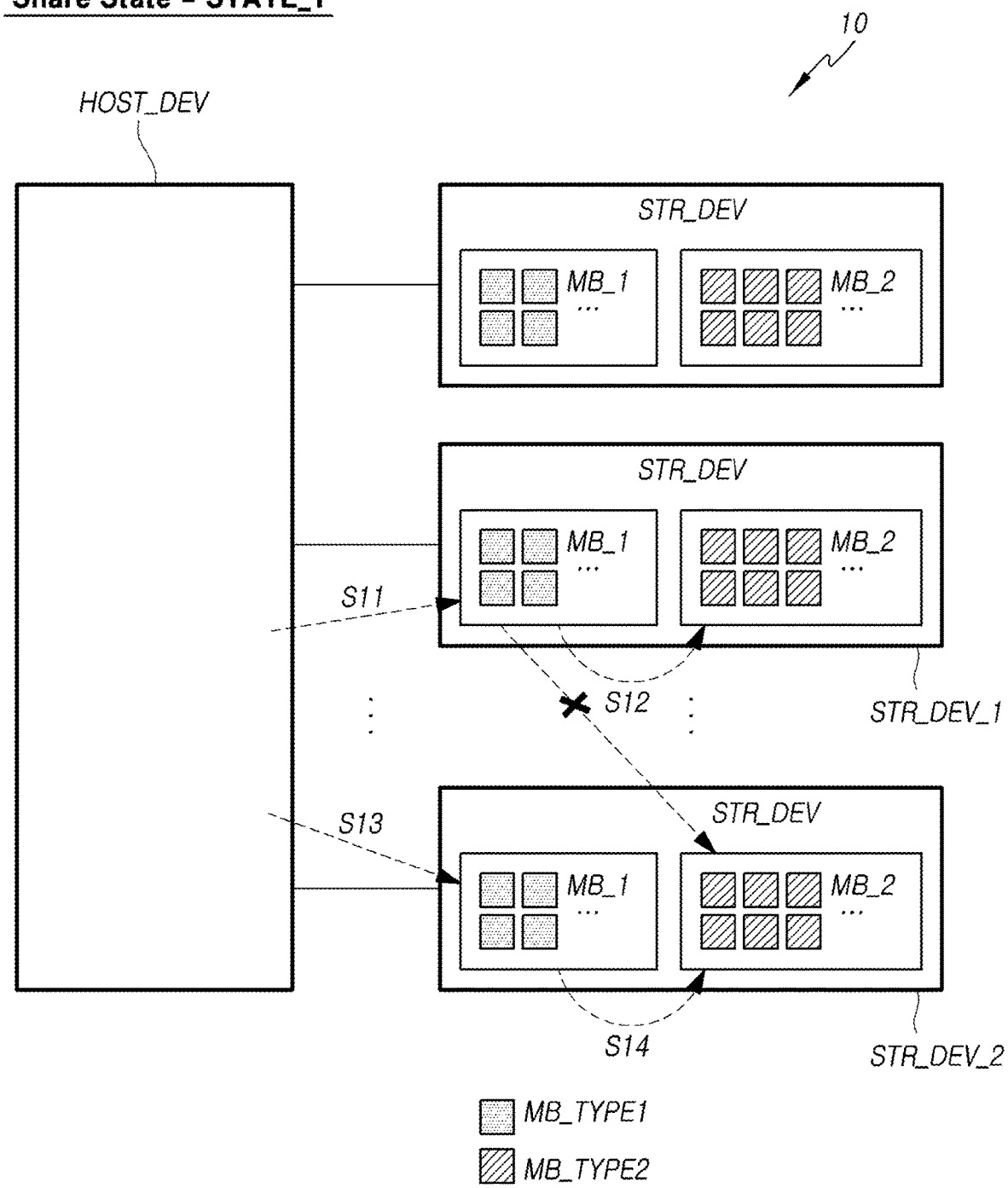
FIG. 8 illustrates an operation of the storage device sharing system when the shared state of the first storage device is the first state according to embodiments of the present disclosure.

FIG. 8 illustrates operations which the storage device sharing system 10 may execute when the shared state of the first storage device STR_DEV_1 is the first state STATE_1 according to embodiments of the present disclosure, where the first state STATE_1 corresponds to a state where the first storage device STR_DEV_1 does not share its storage with other devices.

Referring to FIG. 8, the host device HOST_DEV of the storage device sharing system 10 may set, when the sharing state is the first state STATE_1, the first memory buffer MB_1 of the first storage device STR_DEV_1 to store only data to be written to the first storage device STR_DEV_1. In this case, data to be written to a storage device other than the first storage device STR_DEV_1 may not be stored in the first memory buffer MB_1 of the first storage device STR_DEV_1.

In FIG. 8, in operation S11, the host device HOST_DEV may store data to be written to the first storage device STR_DEV_1 in the first memory buffer MB_1 of the first storage device STR_DEV_1. Subsequently, in operation S12, the host device HOST_DEV may migrate data stored in the first memory buffer MB_1 of the first storage device STR_DEV_1 to the second memory buffer MB_2 of the first storage device STR_DEV_1.

In operation S13, the host device HOST_DEV may store data to be written to the second storage device STR_DEV_2 in the first memory buffer MB_1 of the second storage device STR_DEV_2. Subsequently, in operation S14, the host device HOST_DEV may migrate data stored in the first memory buffer MB_1 of the second storage device STR_DEV_2 to the second memory buffer MB_2 of the second storage device STR_DEV_2.

However, in FIG. 8, data stored in the first memory buffer MB_1 of the first storage device STR_DEV_1 is not migrated to the second memory buffer MB_2 of the second storage device STR_DEV_2. That is, when the sharing state is the first state STATE_1, corresponding to a state where the first storage device STR_DEV_1 does not share storage with other devices, the first memory buffer MB_1 of the first storage device STR_DEV_1 is not permitted to be shared by the second storage device STR_DEV_2.

Figure 9:
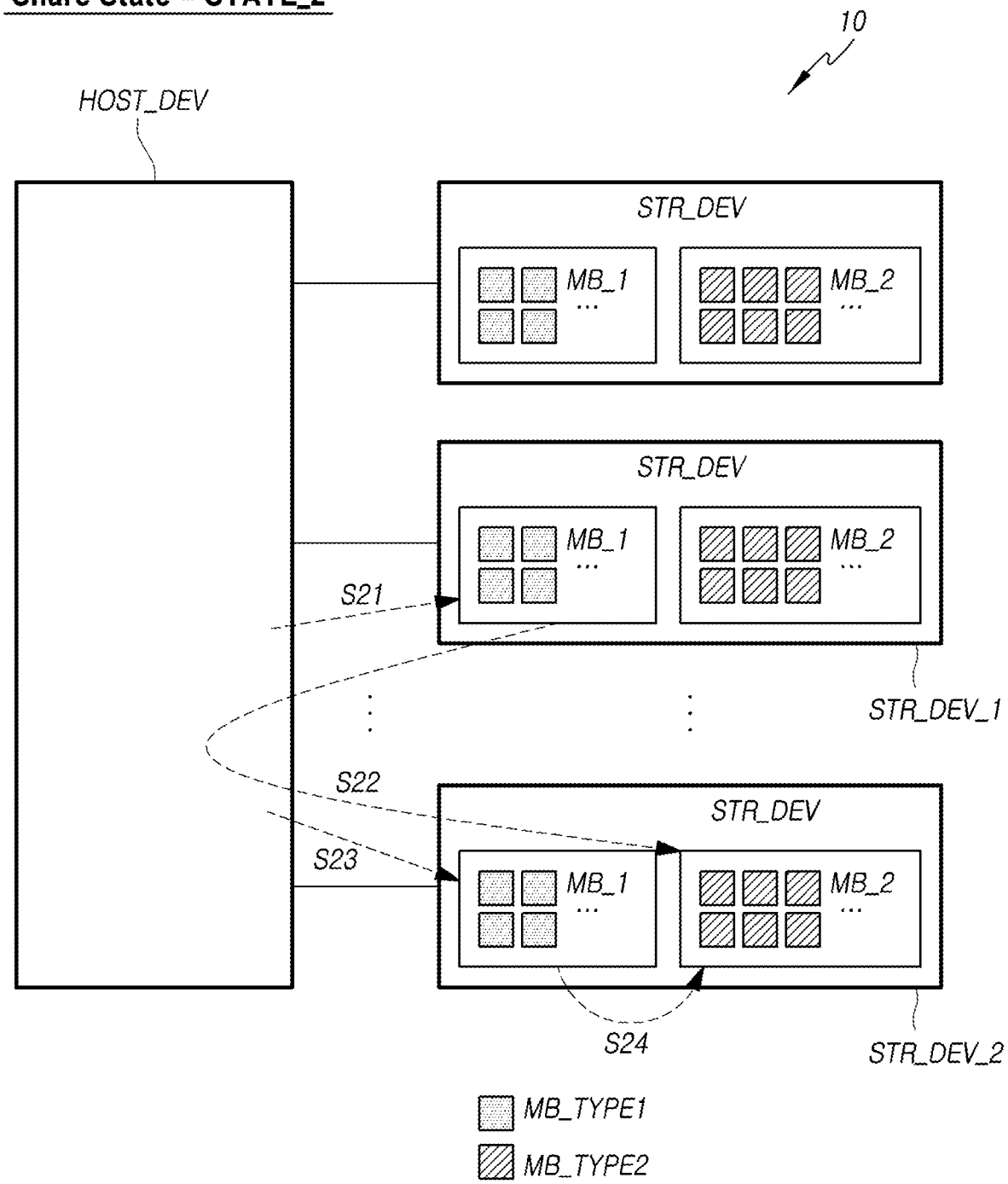
FIG. 9 illustrates an operation of the storage device sharing system when the shared state of the first storage device is the second state according to embodiments of the present disclosure.

FIG. 9 illustrates operations which the storage device sharing system 10 may execute when the shared state of the first storage device STR_DEV_1 is the second state STATE_2 according to embodiments of the present disclosure, the second state STATE_2 corresponding to a state where the first storage device STR_DEV_1 shares its storage with other devices.

Referring to FIG. 9, the host device HOST_DEV of the storage device sharing system 10 may set, when the sharing state is the second state STATE_2, the first memory buffer MB_1 of the first storage device STR_DEV_1 to enable storing data to be written to the second storage device STR_DEV_2.

That is, in operation S21, the host device HOST_DEV stores data to be written to the second storage device STR_DEV_2 in the first memory buffer MB_1 of the first storage device STR_DEV_1. Subsequently, in operation S22, the host device HOST_DEV may migrate data stored in the first memory buffer MB_1 of the first storage device STR_DEV_1 to the second memory buffer MB_2 of the second storage device STR_DEV_2.

In addition, in operation S23 the host device HOST_DEV may store data to be written to the second storage device STR_DEV_2 in the first memory buffer MB_1 of the second storage device STR_DEV_2. Subsequently, in operation S24 the host device HOST_DEV may migrate data stored in the first memory buffer MB_1 of the second storage device STR_DEV_2 to the second memory buffer MB_2 of the second storage device STR_DEV_2.

That is, when the sharing state of the first storage device STR_DEV_1 is the second state STATE_2, the first memory buffer MB_1 of the first storage device STR_DEV_1 and the first memory buffer MB_1 of the second storage device STR_DEV_2 may be used together as an area in which data to be migrated to the second memory buffer MB_2 of the second storage device STR_DEV_2 is to be stored. Accordingly, the performance of writing data to the second storage device STR_DEV_2 may be improved.

As described above, the host device HOST_DEV may change the sharing state of the first storage device STR_DEV_1 when a predetermined sharing condition is satisfied. Hereinafter, an operation in which the host device HOST_DEV determines whether to change the sharing state of the first storage device STR_DEV_1 by determining whether a predetermined sharing condition is satisfied will be described.

Figure 10:
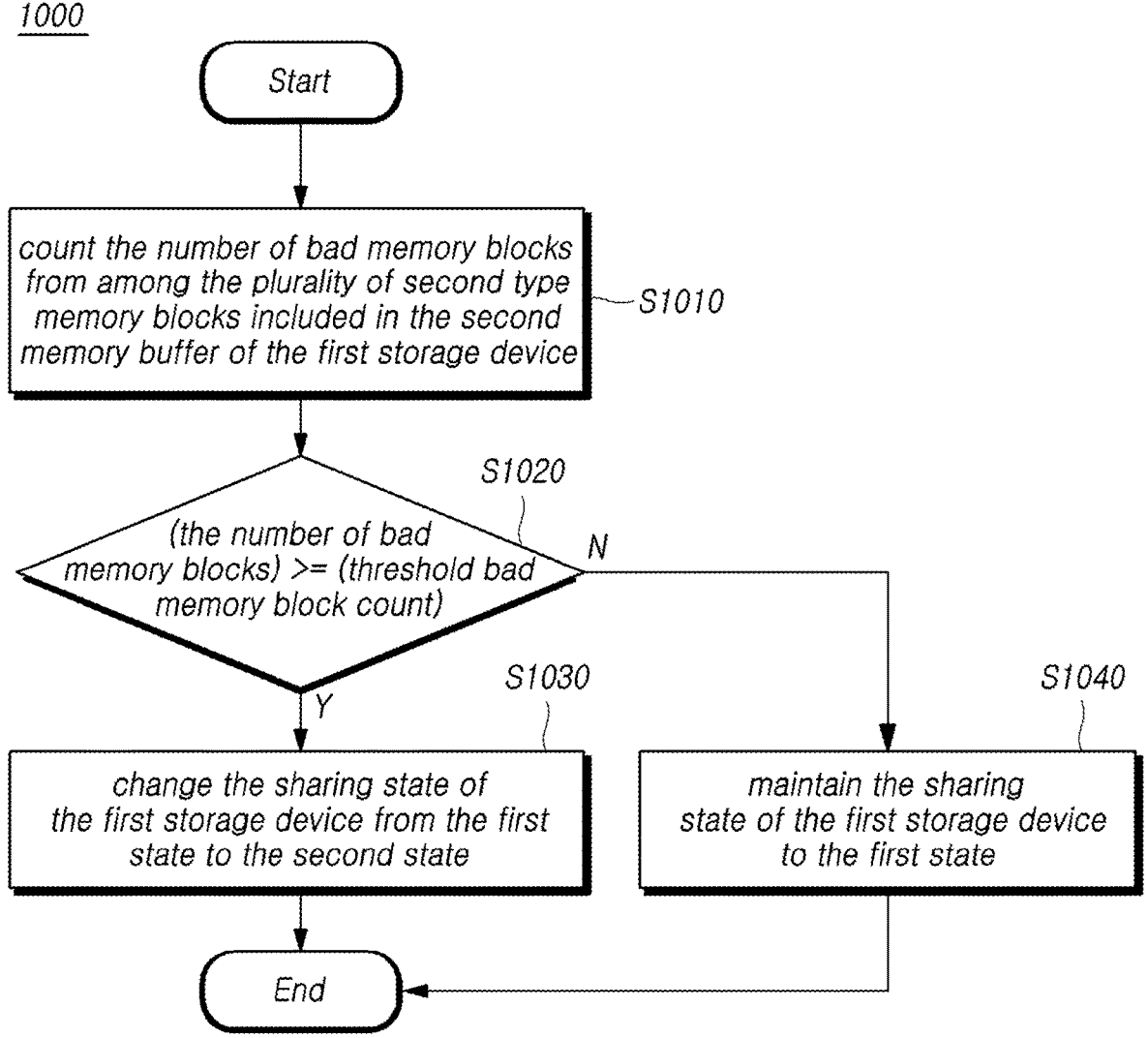
FIG. 10 illustrates an operation in which the host device determines whether to change the shared state of the first storage device according to embodiments of the present disclosure.

FIG. 10 illustrates an operation 1000 in which the host device HOST_DEV determines whether to change the shared state of the first storage device STR_DEV_1 according to embodiments of the present disclosure.

Referring to FIG. 10, at step S1010, the host device HOST_DEV may count the number of bad memory blocks among the plurality of second type memory blocks MB_TYPE2 included in the second memory buffer MB_2 of the first storage device STR_DEV_1.

At step S1020, the host device HOST_DEV determines whether the number of bad memory blocks counted in operation S1010 is equal to or greater than a set threshold bad memory block count.

When the counted number of bad memory blocks is greater than or equal to the threshold bad memory block count (S1020-Y), the host device HOST_DEV may at step S1030 change the sharing state of the first storage device STR_DEV_1 from the first state to the second state.

The number of bad memory blocks included in the second memory buffer MB_2 of the first storage device STR_DEV_1 being equal to or greater than the threshold bad memory block count indicates that the reliability of data stored in the second memory buffer MB_2 of the first storage device STR_DEV_1 may not be guaranteed. Accordingly, the host device HOST_DEV may determine not to use the second memory buffer MB_2 of the first storage device STR_DEV_1 anymore.

However, even in this case, the first memory buffer MB_1 of the first storage device STR_DEV_1 is available. Accordingly, the host device HOST_DEV may change the sharing state of the first storage device STR_DEV_1 from the first state (in which sharing is not allowed) to the second state (in which sharing is allowed) in order to productively utilize the first memory buffer MB_1 of the first storage device STR_DEV_1. Through this, the host device HOST_DEV may use the first memory buffer MB_1 of the first storage device STR_DEV_1 to store data to be written to a second storage device STR_DEV_2. Accordingly, the host device HOST_DEV may prevent the problem that the first memory buffer MB_1 of the first storage device STR_DEV_1 is also unavailable when the second memory buffer MB_2 of the first storage device STR_DEV_1 is unavailable.

On the other hand, when the counted number of bad memory blocks is less than the threshold bad memory block count (S1020-N), at step S1040 the host device HOST_DEV may maintain the sharing state of the first storage device STR_DEV_1 as the first state. This is because the first memory buffer MB_1 of the first storage device STR_DEV_1 may be used for storing data to be written in the second memory buffer MB_2 of the first storage device STR_DEV_1.

Figure 11:
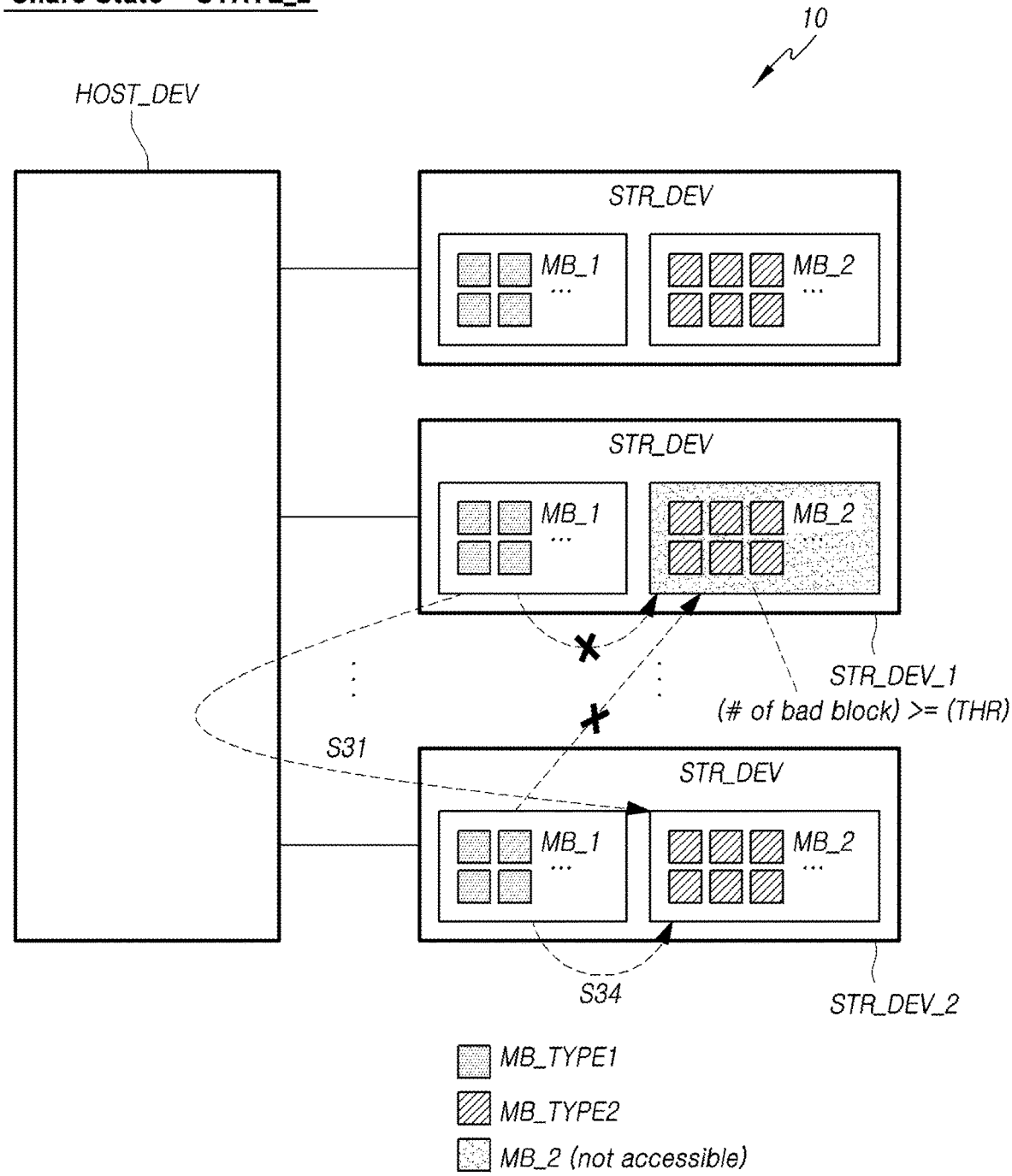
FIG. 11 illustrates an operation of the storage device sharing system after the sharing state of the first storage device is changed to the second state according to embodiments of the present disclosure.

FIG. 11 illustrates an operation of the storage device sharing system 10 after the sharing state of the first storage device STR_DEV_1 is changed to the second state STATE_2 according to embodiments of the present disclosure.

Referring to FIG. 11, the host device HOST_DEV may disable, when changing the sharing state from the first state to the second state, access to the second memory buffer MB_2 of the first storage device STR_DEV_1.

To this end, the host device HOST_DEV may suspend ordinary input/output operation (for example, input/output operations requested by an external source for storing or retrieving data to the second memory buffer MB_2 of the first storage device STR_DEV_1) for the first storage device STR_DEV_1. For example, the host device HOST_DEV may suspend input/out operation to the first storage device STR_DEV_1 when a power off, reboot or suspend operation is executed.

In addition, the host device HOST_DEV may migrate data already stored in the first memory buffer MB_1 and the second memory buffer MB_2 of the first storage device STR_DEV_1 to another storage device to ensure data integrity.

This is because the reliability of data stored in the second memory buffer MB_2 of the first storage device STR_DEV_1 is no longer guaranteed since the number of bad memory blocks included in the second memory buffer MB_2 of the first storage device STR_DEV_1 is equal to or greater than the threshold bad memory block count THR.

As such, when access to the second memory buffer MB_2 of the first storage device STR_DEV_1 is disabled, it is impossible to migrate data stored in the first memory buffer MB_1 of the first storage device STR_DEV_1 to the second memory buffer MB_2 of the first storage device STR_DEV_1.

Also, when access to the second memory buffer MB_2 of the first storage device STR_DEV_1 is disabled, it is impossible to migrate data stored in the first memory buffer MB_1 of the second storage device STR_DEV_2 to the second memory buffer MB_2 of the first storage device STR_DEV_1.

Therefore, in order to utilize the first memory buffer MB_1 of the first storage device STR_DEV_1, the host device HOST_DEV may set the first memory buffer MB_1 of the first storage device STR_DEV_1 as an area for storing data to be written in the second storage device STR_DEV_2. In this case, it is possible for data stored in the first memory buffer MB_1 of the first storage device STR_DEV_1 to be migrated to the second memory buffer MB_2 of the second storage device STR_DEV_2, as shown by operation S31. Data stored in the first memory buffer MB_1 of the second storage device STR_DEV_2 may also be migrated to the second memory buffer MB_2 of the second storage device STR_DEV_2, as shown by operation S34.

Through this, the host HOST_DEV may prevent a problem that the first memory buffer MB_1 of the first storage device STR_DEV_1 is not utilized when access to the second memory buffer MB_2 of the first storage device STR_DEV_1 is disable.

The operation of the host device HOST_DEV setting the first memory buffer MB_1 of the first storage device STR_DEV_1 as an area for storing data to be written in the second storage device STR_DEV_2 has been described above.

Hereinafter, a method in which the host device HOST_DEV determines the second storage device STR_DEV_2 from among the plurality of storage devices STR_DEV will be described.

Figure 12:
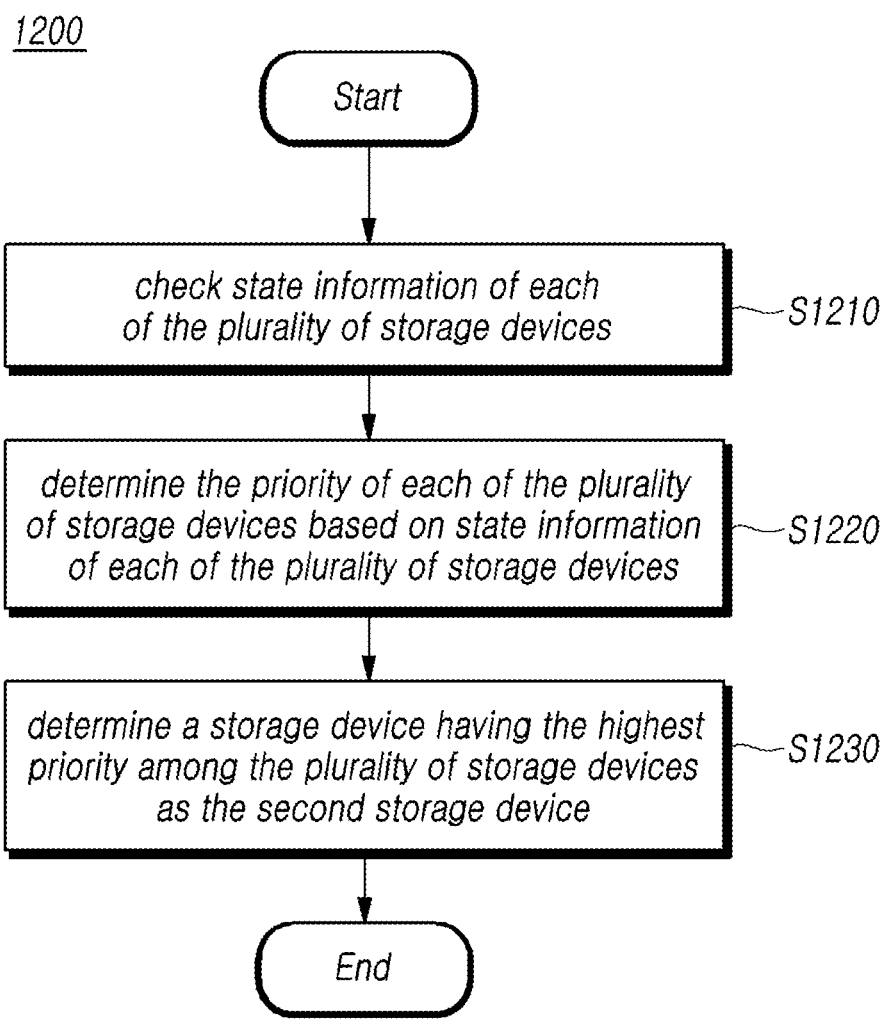
FIG. 12 illustrates an operation in which the storage device sharing system determines a priority for sharing of each of the plurality of storage devices according to embodiments of the present disclosure.

FIG. 12 illustrates an operation 1200 in which the storage device sharing system 10 determines the priority of the plurality of storage devices STR_DEV according to embodiments of the present disclosure.

Referring to FIG. 12, in operation S1210, the host device HOST_DEV of the storage device sharing system 10 may check state information of each of the plurality of storage devices STR_DEV. In this case, as described above, the state information of each of the plurality of storage devices STR_DEV may include information about memory blocks included therein (e.g., storage state of hot/cold data, error bit occurrence status, wear-leveling execution status, garbage collection execution status, bad memory block status, and the like, or combinations thereof).

In operation S1220, the host device HOST_DEV may determine the priority of each the plurality of storage devices STR_DEV based on the state information of each of the plurality of storage devices STR_DEV that was checked in operation S1210.

For example, the host device HOST_DEV may determine the priority of each of the plurality of storage devices STR_DEV based on the size of hot data stored in each of the plurality of storage devices STR_DEV. Here, hot data means, for example, data for which the number of reads or writes during a predetermined time period is equal to or greater than a set threshold value. On the other hand, cold data means data for which the number of reads or writes during a predetermined time period is less than a set threshold value.

For another example, the host device HOST_DEV may determine the priority of each of the plurality of storage devices STR_DEV based on the sum of the number of read, write and erase operations performed on each of the plurality of storage devices STR_DEV during a predetermined time period.

For another example, the host device HOST_DEV may input state information of each of the plurality of storage devices STR_DEV into a machine learning model for determining the priority of each of the plurality of storage device STR_DEV. The host device HOST_DEV may determine the priority of each of the plurality of storage devices STR_DEV based on an output produced by the machine learning model. In this case, the machine learning model may be re-trained according to changes in the operation performance of the plurality of storage devices STR_DEV according to the priority of each of the plurality of storage devices STR_DEV.

The host device HOST_DEV may set a higher priority to a storage device that stores more hot data among the plurality of storage devices STR_DEV, and set a lower priority to a storage device that stored less hot data among the plurality of storage devices STR_DEV. Since a storage device having a lot of hot data may execute a lot of read or write operations, the degree of performance improvement of the storage device may increase when a resource of other storage device is used to aid the performance of those read and/or write operations.

In operation S1230, the host device HOST_DEV may determine a storage device having the highest priority among the plurality of storage devices STR_DEV as the second storage device STR_DEV_2 with which another storage device shares storage.

For example, the host device HOST_DEV may determine a storage device storing the most hot data among the plurality of storage devices STR_DEV as the second storage device STR_DEV_2.

For another example, the host device HOST_DEV may determine a storage device having the largest sum of the number of read, write, and erase operations performed during a predetermined time period among the plurality of storage devices STR_DEV as the second storage device STR_DEV_2.

Figure 13:
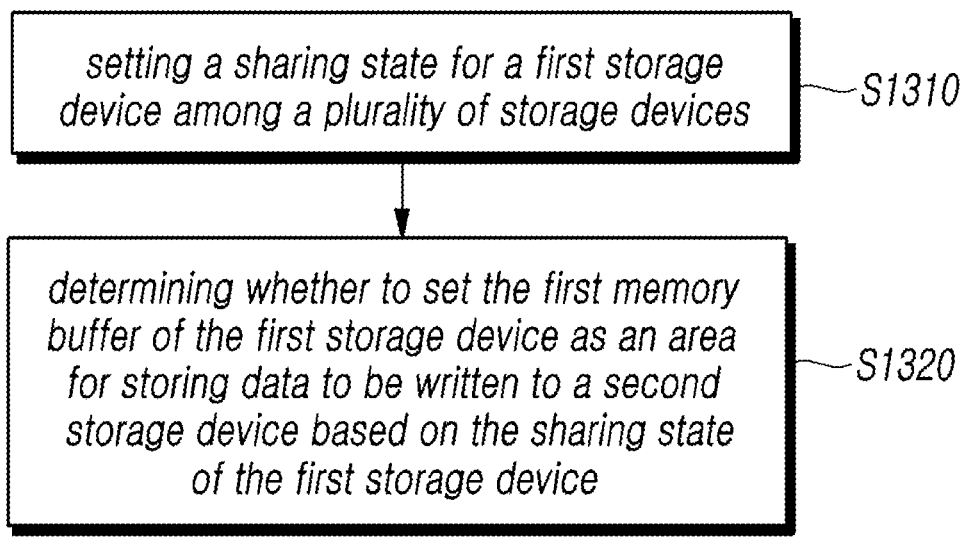
FIG. 13 illustrates an operating method of the storage device sharing system according to embodiments of the present disclosure.

FIG. 13 illustrates an operating method 1300 of a storage device sharing system according to embodiments of the present disclosure.

Referring to FIG. 13, the operating method 1300 of the storage device sharing system may include an operation S1310 of setting a sharing state for a first storage device STR_DEV_1 among a plurality of storage devices STR_DEV. In this case, each of the plurality of storage devices STR_DEV may include i) a first memory buffer MB_1 including a plurality of first type memory blocks MB_TYPE1 and ii) a second memory buffer MB_2 including a plurality of second type memory blocks MB_TYPE2.

The number of data bits storable in the memory cells included in the first type memory blocks MB_TYPE1 may be less than the number of data bits storable in the memory cells included in the second type memory blocks MB_TYPE2.

The operating method of the storage device sharing system may also include an operation S1320 of determining, based on the sharing state of the first storage device STR_DEV_1, whether to set the first memory buffer MB_1 of the first storage device STR_DEV_1 as an area for storing data to be written to a second storage device STR_DEV_2 among the plurality of storage devices STR_DEV.

For example, the first memory buffer MB_1 of the first storage device STR_DEV_1 is configured to store only data to be written to the first storage device STR_DEV_1 when the sharing state is a first state STATE_1, and is configured to store data to be written to the second storage device STR_DEV_2 when the sharing state is a second state STATE_2.

Meanwhile, the operation S1320 may include counting the number of bad memory blocks among a plurality of second type memory blocks MB_TYPE2 included in the second memory buffer MB_2 of the first storage device STR_DEV_1. And the operation S1320 may include setting the sharing state from the first state to the second state when the number of bad memory blocks is greater than or equal to a set threshold bad memory block count.

When the sharing state for the first storage device STR_DEV_1 is changed from the first state to the second state, access to the second memory buffer MB_2 of the first storage device STR_DEV_1 may be disabled.

The operating method of the storage device sharing system may further include determining a priority of each of the plurality of storage devices STR_DEV based on state information of each of the plurality of storage device STR_DEV, and determining a storage device having the highest priority among the plurality of storage devices STR_DEV as the second storage device STR_DEV_2 with which the first device STR_DEV_1 shares storage.

In an embodiment, the priority of each of the plurality of storage devices STR_DEV may be determined based on the size of hot data stored in each of the plurality of storage devices STR_DEV.

Figure 14:
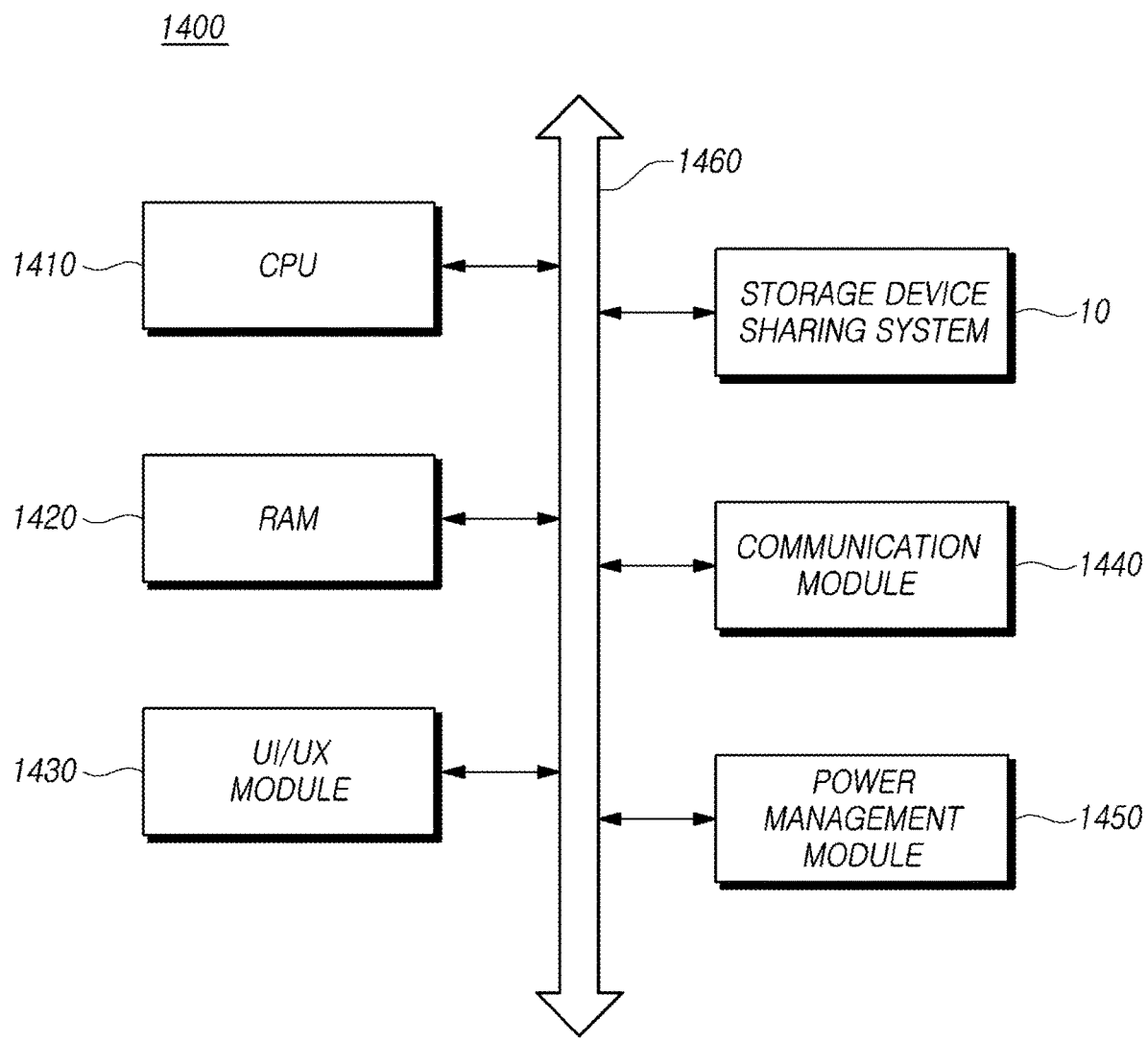
FIG. 14 illustrates a configuration of a computing system based on some embodiments of the disclosed technology.

FIG. 14 illustrates a computing system 1400 based on an embodiment of the disclosed technology.

Referring to FIG. 14, the computing system 1400 based on an embodiment of the disclosed technology may include: a storage device sharing system 10 electrically connected to a system bus 1460; a CPU 1410 configured to control the overall operation of the computing system 1400; a RAM 1420 configured to store data and information related to operations of the computing system 1400; a user interface/user experience (UI/UX) module 1430 configured to provide the user with a user environment; a communication module 1440 configured to communicate with an external device as a wired and/or wireless type; and a power management module 1450 configured to manage power used by the computing system 1400.

The computing system 1400 may be a personal computer (PC) or may include a mobile terminal such as a smartphone, a tablet or various electronic devices.

The computing system 1400 may further include a battery for supplying an operating voltage, and may further include an application chipset, a graphic-related module, a camera image processor, and a DRAM. Other elements would be obvious to a person skilled in the art.

The storage device sharing system 10 may correspond to the storage device sharing systems 10 of FIG. 5, and may include a device configured to store data in a magnetic disk such as a hard disk drive (HDD), a device configured to store data in a nonvolatile memory (such as a solid state drive (SSD), a universal flash storage device, or an embedded MMC (eMMC) device), or combinations thereof. The nonvolatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the storage device sharing system 10 may be implemented as storage devices of various types and mounted inside various electronic devices.

Based on embodiments of the disclosed technology described above, the operation delay time of a storage system including a plurality of storage devices may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A storage device sharing system comprising:
a plurality of storage devices, each storage device including:
a first memory buffer including a plurality of first type memory blocks, and
a second memory buffer including a plurality of second type memory blocks; and
a host device configured to determine, based on a sharing state set for a first storage device among the plurality of storage devices, whether to set the first memory buffer of the first storage device as an area for storing data to be written to a second storage device among the plurality of storage devices.

2. The storage device sharing system of claim 1, wherein the number of data bits storable in the memory cells included in the first type memory blocks is less than the number of data bits storable in the memory cells included in the second type memory blocks.

3. The storage device sharing system of claim 1, wherein when the sharing state is a first state, the host device configures the first memory buffer of the first storage device to store only data to be written to the first storage device, and
wherein when the sharing state is a second state, the host device configures the first memory buffer of the first storage device to store data to be written to the second storage device.

4. The storage device sharing system of claim 3, wherein the host device changes the sharing state from the first state to the second state when the number of bad memory blocks among a plurality of second type memory blocks included in the second memory buffer of the first storage device is greater than or equal to a threshold bad memory block count.

5. The storage device sharing system of claim 4, wherein the host device disables, when changing the sharing state from the first state to the second state, access to the second memory buffer of the first storage device.

6. The storage device sharing system of claim 1, wherein the host device determines a priority of each of the plurality of storage devices based on state information of each of the plurality of storage device, and
wherein the host device determines a storage device having the highest priority among the plurality of storage devices as the second storage device.

7. The storage device sharing system of claim 1, wherein the host device determines a priority of each of the plurality of storage devices based on the size of hot data stored in each of the plurality of storage devices.

8. An operating method of a storage device sharing system, the operating method comprising:
- setting a sharing state for a first storage device among a plurality of storage devices included in the storage device sharing system, each storage device including a first memory buffer including a plurality of first type memory blocks and a second memory buffer including a plurality of second type memory blocks, and
- determining, based on the sharing state of the first storage device, whether to configure the first memory buffer of the first storage device as an area for storing data to be written to a second storage device among the plurality of storage devices.

9. The operating method of claim 8,
wherein the number of data bits storable in the memory cells included in the first type memory blocks is less than the number of data bits storable in the memory cells included in the second type memory blocks.

10. The operating method of claim 8,
wherein when the sharing state is a first state, the first memory buffer of the first storage device is configured to store only data to be written to the first storage device, and
wherein when the sharing state is a second state, the first memory buffer of the first storage device is configured to store data to be written to the second storage device.

11. The operating method of claim 10,
wherein setting the sharing state for the first storage device comprises:
counting the number of bad memory blocks among a plurality of second type memory blocks included in the second memory buffer of the first storage device; and
changing the sharing state from the first state to the second state when the number of bad memory blocks is greater than or equal to a set threshold bad memory block count.

12. The operating method of claim 11,
wherein changing the sharing state for the first storage device from the first state to the second state comprises disabling access to the second memory buffer of the first storage device.

13. The operating method of claim 8, further comprising
determining a priority of each of the plurality of storage devices based on state information of each of the plurality of storage device, and
determining a storage device having the highest priority among the plurality of storage devices as the second storage device.

14. The operating method of claim 13,
wherein the priority of each of the plurality of storage devices is determined based on the size of hot data stored in each of the plurality of storage devices.

* * * * *